United States Patent
Lin et al.

(10) Patent No.: US 6,207,750 B1
(45) Date of Patent: Mar. 27, 2001

(54) PROPYLENE HOMOPOLYMERS AND METHODS OF MAKING THE SAME

(75) Inventors: Chon-Yie Lin; Michael Chia-Chao Chen, both of Houston; Aspy Keki Mehta, Humble; Rajan K. Chudgar, League City, all of TX (US)

(73) Assignee: Exxon Chemical Patents, Inc., Baytown, TX (US)

( * ) Notice: Subject to any disclaimer, the term of this patent is extended or adjusted under 35 U.S.C. 154(b) by 0 days.

(21) Appl. No.: 09/293,656

(22) Filed: Apr. 16, 1999

Related U.S. Application Data (60) Provisional application No. 60/085,317, filed on May 13, 1998.

(51) Int. Cl.$^7$ ............................. C08G 63/48; C08F 8/00

(52) U.S. Cl. ........................... 525/53; 525/195; 525/240; 525/242; 525/245

(58) Field of Search ............................. 525/53, 195, 240, 525/242, 245

(56) References Cited

U.S. PATENT DOCUMENTS

| | | | |
|---|---|---|---|
| 4,530,914 | 7/1985 | Ewen et al. | 502/113 |
| 4,542,199 | 9/1985 | Kaminsky et al. | 526/160 |
| 4,665,208 | 5/1987 | Welborn, Jr. et al. | 556/179 |
| 4,701,432 | 10/1987 | Welborn, Jr. | 502/113 |
| 4,769,910 | 9/1988 | Noon | 30/91.2 |
| 4,808,561 | 2/1989 | Welborn, Jr. | 502/104 |
| 4,871,705 | 10/1989 | Hoel | 502/117 |
| 4,874,734 | 10/1989 | Kioka et al. | 502/104 |
| 4,908,463 | 3/1990 | Bottelberghe | 556/179 |
| 4,921,825 | 5/1990 | Kioka et al. | 502/104 |
| 4,923,833 | 5/1990 | Kioka et al. | 502/9 |
| 4,924,018 | 5/1990 | Bottelberghe | 556/179 |
| 4,933,403 | 6/1990 | Kaminsky et al. | 526/160 |
| 4,937,299 | 6/1990 | Ewen et al. | 526/119 |
| 4,952,540 | 8/1990 | Kioka et al. | 502/9 |
| 4,968,827 | 11/1990 | Davis | 556/179 |
| 5,017,714 | 5/1991 | Welborn, Jr. | 556/12 |
| 5,026,798 | 6/1991 | Canich | 526/127 |
| 5,057,475 | 10/1991 | Canich et al. | 502/104 |
| 5,091,352 | 2/1992 | Kioka et al. | 502/103 |
| 5,103,031 | 4/1992 | Smith, Jr. | 556/179 |
| 5,120,867 | 6/1992 | Welborn, Jr. | 556/12 |
| 5,145,819 | 9/1992 | Winter et al. | 502/117 |
| 5,157,137 | 10/1992 | Sangokoya | 556/179 |
| 5,198,401 | 3/1993 | Turner et al. | 502/155 |
| 5,204,419 | 4/1993 | Tsutsui et al. | 526/153 |
| 5,206,199 | 4/1993 | Kioka et al. | 502/117 |
| 5,235,081 | 8/1993 | Sangokoya | 556/179 |
| 5,239,022 | 8/1993 | Winter et al. | 526/127 |
| 5,240,894 | 8/1993 | Burkhardt et al. | 502/108 |
| 5,243,001 | 9/1993 | Winter et al. | 526/127 |
| 5,248,801 | 9/1993 | Sangokoya | 556/179 |
| 5,252,389 | 10/1993 | Schmidt et al. | 428/334 |
| 5,276,208 | 1/1994 | Winter et al. | 556/53 |
| 5,278,119 | 1/1994 | Turner et al. | 502/155 |
| 5,280,074 | 1/1994 | Schreck et al. | 525/240 |
| 5,296,434 | 3/1994 | Karl et al. | 502/117 |
| 5,304,614 | 4/1994 | Winter et al. | 526/127 |
| 5,308,815 | 5/1994 | Sangokoya | 502/104 |
| 5,322,902 | 6/1994 | Schreck et al. | 525/247 |
| 5,324,800 | 6/1994 | Welborn, Jr. et al. | 526/160 |
| 5,329,032 | 7/1994 | Tran et al. | 556/179 |
| 5,329,033 | 7/1994 | Spaleck et al. | 556/53 |
| 5,346,925 | 9/1994 | Sugano et al. | 521/54 |

(List continued on next page.)

FOREIGN PATENT DOCUMENTS

| | | |
|---|---|---|
| 2133181 | 3/1995 | (CA) . |
| 196 22 083 A1 | 12/1997 | (DE) . |
| 0 277 004 | 8/1988 | (EP) . |
| 0 279 586 | 8/1988 | (EP) . |
| 0 279 863 | 8/1988 | (EP) . |
| 0 320 762 | 6/1989 | (EP) . |
| 0 354 893 | 2/1990 | (EP) . |
| 0 426 637 | 5/1991 | (EP) . |
| 0 495 375 | 7/1992 | (EP) . |
| 0 500 944 | 9/1992 | (EP) . |
| 0 507 876 | 10/1992 | (EP) . |
| 0 520 732 | 12/1992 | (EP) . |
| 0 549 900 | 7/1993 | (EP) . |
| 0 551 277 | 7/1993 | (EP) . |
| 0 561 476 | 9/1993 | (EP) . |
| 0 570 982 | 11/1993 | (EP) . |
| 0 573 403 | 12/1993 | (EP) . |
| 0 576 970 | 1/1994 | (EP) . |
| 0 594 218 | 4/1994 | (EP) . |
| 0 662 979 | 7/1995 | (EP) . |
| 0 670 334 | 9/1995 | (EP) . |
| 0 672 689 | 9/1995 | (EP) . |
| 0 736 552 | 10/1996 | (EP) . |
| WO 94/03506 | 2/1994 | (WO) . |
| WO 94/10180 | 5/1994 | (WO) . |
| WO 94/28034 | 12/1994 | (WO) . |
| WO 95/08285 | 3/1995 | (WO) . |
| WO 96/00243 | 1/1996 | (WO) . |
| WO 96/00245 | 1/1996 | (WO) . |
| WO 98/10016 | 3/1998 | (WO) . |
| WO 99/16797 | 4/1999 | (WO) . |

OTHER PUBLICATIONS

Ferdinand R.W.P. Wild, et al., "ansa–Metallocene Derivatives–VII. Synthesis and Crystal Structure of a Chiral ansa–Zirconocene Derivative with Ethylene–Bridged Tetrahydroindenyl Ligands"—*Journal of Organometallic Chemistry*, v.288 (1985) pp. 63–67.

*Primary Examiner*—Nathan M. Nutter
(74) *Attorney, Agent, or Firm*—David J. Alexander; William G. Muller; Kevin M. Faulkner (57) ABSTRACT

This invention relates to isotactic propylene homopolymer compositions obtained from metallocene catalysis wherein the polymer has a molecular weight distribution (Mw/Mn) in the range of from about 2.5 to about 20.0. The isotactic propylene homopolymer composition may be prepared in a multiple stage polymerization process using the same metallocene component in at least two stages.

11 Claims, 3 Drawing Sheets

U.S. PATENT DOCUMENTS

| | | | |
|---|---|---|---|
| 5,350,723 | 9/1994 | Neithamer et al. | 502/104 |
| 5,350,817 | 9/1994 | Winter et al. | 526/119 |
| 5,374,752 | 12/1994 | Winter et al. | 556/11 |
| 5,391,790 | 2/1995 | Rohrmann et al. | 556/28 |
| 5,407,884 | 4/1995 | Turner et al. | 502/155 |
| 5,483,002 | 1/1996 | Seelert et al. | 525/240 |
| 5,483,014 | 1/1996 | Turner et al. | 526/113 |
| 5,510,502 | 4/1996 | Sugano et al. | 556/11 |
| 5,532,325 | 7/1996 | Oka et al. | 526/79 |
| 5,643,847 | 7/1997 | Walzer, Jr. | 502/117 |
| 5,672,668 | 9/1997 | Winter et al. | 526/127 |

PROPYLENE HOMOPOLYMERS AND METHODS OF MAKING THE SAME

This is a Regular Application of Provisional Application 60/085,317 filed May 13, 1998.

FIELD OF THE INVENTION

This invention relates generally to isotactic propylene homopolymer compositions and to methods for their production and use.

BACKGROUND

Multiple stage polymerization processes are known in the art as is the use of metallocene catalyst systems. Multiple stage polymerization processes, such as two-stage polymerization processes, are generally used to prepare block copolymers which contain rubbery materials. Two-stage polymerization process products may include propylene block copolymers. In some instances, the propylene/ethylene copolymer portion of these block copolymers may be rubbery. In these instances, these products may be more suitable for molding applications rather than films. In other instances, two or more metallocenes may be used for the preparation of isotactic propylene polymers.

Related patents and patent applications include: U.S. Pat. Nos. 5,280,074, 5,322,902, 5,346,925, 5,350,817, 5,483,002 and Canadian Patent Application No. 2,133,181.

SUMMARY

It has been discovered that isotactic propylene homopolymer compositions may be made by polymerizing propylene in one stage using a metallocene catalyst system and then in a separate stage using the same catalyst system to further polymerize the polymer but to a different molecular weight. The different molecular weights are produced by varying the concentration of a chain transfer agent such as hydrogen.

The resulting polymers have surprisingly high molecular weight and broad molecular weight distribution, and offer processability benefits in many applications but particularly in oriented film applications. Films made from these unique polymers have a significantly broader processability range and can be evenly stretched at lower temperatures compared to the polypropylene films available today. The resulting films have a favorable balance of properties including high strength, good optical properties, excellent shrinkage and good barrier properties.

As such, this invention relates to a propylene polymer composition which includes an isotactic propylene homopolymer with a molecular weight distribution in the range from about 2.5 to about 20.0 having hexane extractables of less than 1.0 weight percent. When the propylene polymer composition is formed into a film, the biaxially oriented film properties further characterize this propylene polymer composition. For example, the propylene polymer film, having pre-stretched dimensions of 50.8 mm×50.8 mm×20 mil, exhibits an even stretch when stretched to a final stretched thickness of about 0.75 mil between the temperature ranges of from 151.7° C. to 157.2° C. on a T. M. Long biaxial stretching apparatus. Before stretching, the film is preheating for 27 seconds at the stretching temperature. The film is stretched at a rate of 76.2 mm/sec.

In another embodiment, the propylene polymer composition may include a blend of first and second propylene homopolymers. The first propylene homopolymer may have a melt flow rate in the range of 0.15 dg/min to 4.0 dg/min and a molecular weight distribution in the range of 1.8 to 2.5. The second propylene homopolymer may have a melt flow rate in the range of 5 dg/min to 1000 dg/min and a molecular weight distribution in the range of 1.8 to 2.5.

In another embodiment, the propylene polymer composition includes isotactic propylene homopolymer with a molecular weight distribution in the range from about 2.5 to about 20.0, hexane extractables of less than 1.0 weight percent, a melting point greater than 145° C., and a melt flow rate in the range of 0.2 dg/min to 30.0 dg/min. This propylene polymer composition further includes a blend of first and second propylene homopolymers. The first propylene homopolymer may have a melt flow rate in the range of 0.15 dg/min to 4.0 dg/min and a molecular weight distribution in the range of 1.8 to 2.5 and may comprise from 40 percent to 80 percent of the propylene polymer composition. The second propylene homopolymer may have a melt flow rate in the range of 5 dg/min to 1000 dg/min and a molecular weight distribution in the range of 1.8 to 2.5 and may comprises from 20 percent to 60 percent of the propylene polymer. When this propylene polymer composition is formed into a film, the biaxially oriented film properties further characterize this propylene polymer composition. For example, the propylene polymer film, having pre-stretched dimensions of 50.8 mm×50.8 mm×20 mil, exhibits an even stretch when stretched to a final stretched thickness of about 0.75 mil between the temperature ranges of from 151.7° C. to 157.2° C. on a T. M. Long biaxial stretching apparatus. Before stretching, the film is preheating for 27 seconds at the stretching temperature. The film is stretched at a rate of 76.2 mm/sec.

The invention further relates to processes for polymerizing isotactic polypropylene. In one embodiment, this process includes (a) polymerizing propylene in the presence of a metallocene and a first concentration of chain transfer agent sufficient to produce a first propylene homopolymer having a melt flow rate in the range from 0.15 dg/min to 4.0 dg/min and (b) polymerizing propylene in the presence of the first propylene homopolymer in the presence of a second concentration of chain transfer agent sufficient to produce the isotactic polypropylene having a molecular weight distribution in the range of from about 2.5 to about 20. The first propylene homopolymer may have a molecular weight distribution in the range of 1.8 to 2.5. Additionally, step (a) may be performed in a first reactor and step (b) may be performed in a second reactor. Furthermore, the metallocene may be a single metallocene and the single metallocene may also be present in step (b). A second propylene homopolymer having a molecular weight distribution in the range of 1.8 to 2.5 and a melt flow rate in the range from 5 dg/min to 1000 dg/min may be produced in step (b). The chain transfer agent may be hydrogen.

In another embodiment, the process for polymerizing isotactic polypropylene includes (a) polymerizing, propylene in the presence of a metallocene and a first concentration of chain transfer agent sufficient to produce a first propylene homopolymer having a melt flow rate in the range from 5 dg/min to 1000 dg/min and (b) polymerizing propylene in the presence of the first propylene homopolymer in the presence of a second concentration of chain transfer agent sufficient to produce the isotactic polypropylene having a molecular weight distribution in the range of from about 2.5 to about 20. The first propylene homopolymer may have a molecular weight distribution in the range of 1.8 to 2.5. Step (a) may be performed in a first reactor and step (b) may be performed in a second reactor. The metallocene may be a single metallocene and be present in step (b). A second propylene homopolymer having a molecular weight distribution in the range of 1.8 to 2.5 and a melt flow rate in the range from 0.15 dg/min to 4.0 dg/min. may be produced in step (b). The chain transfer agent may be hydrogen.

In still another embodiment, the process includes (a) homopolymerizing propylene in the presence of a single metallocene and a first concentration of chain transfer agent sufficient to produce a first propylene homopolymer having a melt flow rate in the range from 0.15 dg/min to 4.0 dg/min and a molecular weight distribution in the range of 1.8 to 2.5 and (b) homopolymerizing propylene in the presence of the first propylene homopolymer and the single metallocene in the presence of a second concentration of chain transfer agent sufficient to produce a second propylene homopolymer having a molecular weight distribution in the range of 1.8 to 2.5 and a melt flow rate in the range from 5 dg/min to 1000 dg. The resulting isotactic polypropylene is a blend of the first and second homopolymer having a molecular weight distribution in the range of from about 2.5 to about 20 and wherein the first homopolymer comprises from 40 percent to 80 percent of the isotactic polypropylene and the second homopolymer comprises from 20 percent to 60 percent of the isotactic polypropylene. The chain transfer agent in at least one of the steps (a) and (b) is hydrogen.

In still another embodiment the process for polymerizing isotactic polypropylene includes (a) polymerizing propylene in the presence of a metallocene and a first concentration of chain transfer agent sufficient to produce a first propylene homopolymer having a first melt flow rate and a first molecular weight distribution in a first range and (b) polymerizing propylene in the presence of the first propylene homopolymer in the presence of a second concentration of chain transfer agent sufficient to produce a second propylene homopolymer having a second melt flow rate and a second molecular weight distribution in a second range wherein the second range is substantially similar to the first range such that the blend of the first and second propylene homopolymers forms the isotactic polypropylene having a molecular weight distribution in the range from about 2.5 to about 20.

DETAILED DESCRIPTION

This invention relates to (1) methods for making isotactic homopolypropylene; (2) isotactic homopolypropylene compositions; and (3) products made from isotactic homopolypropylene compositions. These are described in turn below.

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn) as determined by gel permeation chromatography (GPC). As used herein, unless otherwise stated, "polymerization" means homopolymerization.

Methods for Making Isotactic Propylene Polymer Compositions

The methods of this invention involve the use of metallocene catalyst systems that comprise a metallocene component and at least one activator. Preferably, these catalyst system components are supported on support material.

Metallocenes

As used herein "metallocene" and "metallocene component" refer generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Preferred metallocenes are those represented by the formula:

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

-continued

—B(R$^{11}$)—, —Al(R$^{11}$)—, —Ge—, —Sn—, —O—, —S—, —SO—, —SO$_2$—, —N(R$^{11}$)—, —CO—, —P(R$^{11}$)—, or —P(O)(R$^{11}$)—; wherein:

R$^{11}$, R$^{12}$ and R$^{13}$ are identical or different and are a hydrogen atom, a halogen atom, a C$_1$–C$_{20}$ alkyl group, preferably a C$_1$–C$_{10}$ alkyl group, a C$_1$–C$_{20}$ fluoroalkyl group, preferably a C$_1$–C$_{10}$ fluoroalkyl group, a C$_6$–C$_{30}$ aryl group, preferably a C$_6$–C$_{20}$ aryl group, a C$_6$–C$_{30}$ fluoroaryl group, preferably a C$_6$–C$_{20}$ fluoroaryl group, a C$_1$–C$_{20}$ alkoxy group, preferably a C$_1$–C$_{10}$ alkoxy group, a C$_2$–C$_{20}$ alkenyl group, preferably a C$_2$–C$_{10}$ alkenyl group, a C$_7$–C$_{40}$ arylalkyl group, preferably a C$_7$–C$_{20}$ arylalkyl group, a C$_8$–C$_{40}$ arylalkenyl group, preferably a C$_8$–C$_{22}$ arylalkenyl group, a C$_7$–C$_{40}$ alkylaryl group, preferably a C$_7$–C$_{20}$ alkylaryl group or R$^{11}$ and R$^{12}$, or R$^{11}$ and R$^{13}$, together with the atoms binding them, can form ring systems;

M$^2$ is silicon, germanium or tin, preferably silicon or germanium, most preferably silicon;

R$^8$ and R$^9$ are identical or different and have the meanings stated for R$^{11}$;

m and n are identical or different and are zero, 1 or 2, preferably zero or 1, m plus n being zero, 1 or 2, preferably zero or 1; and the radicals R$^3$, R$^4$, and R$^{10}$ are identical or different and have the meanings stated for R$^{11}$, R$^{12}$ and R$^{13}$. Two adjacent R$^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred metallocenes are compounds of the structures (A) and (B):

(A)

(B)

wherein:
M$^1$ is Zr or Hf, R$^1$ and R$^2$ are methyl or chlorine, and R$^5$, R$^6$ R$^8$, R$^9$,R$^{10}$, R$^{11}$ and R$^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multi-step process involving repeated deprotonations/metallations of the aromatic ligands and introduction of the bridge and the central atom by their halogen derivatives. The following reaction scheme illustrates this generic approach:

Additional methods for preparing metallocenes are fully described in the *Journal of Organometallic Chem.*, volume 288, (1985), pages 63–67, and in EP-A-320762, both of which are herein fully incorporated by reference.

Illustrative but non-limiting examples of preferred metallocenes include:

Dimethylsilandiylbis (2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl-4-phenyl-1-indenyl)ZrCl$_2$;
Dimethylsilandiylbis (2-ethyl-4-naphthyl-1-indenyl)ZrCl$_2$,
Phenyl(methyl)silandiylbis(2-methyl-4-phenyl-1-indenyl)ZrCl$_2$,
Dimethylsilandiylbis(2-methyl-4-(1-naphthyl)-1-indenyl)ZrCl$_2$,
Dimethylsilandiylbis(2-methyl-4-(2-naphthyl)-1-indenyl)ZrCl$_2$,
Dimethylsilandiylbis(2-methyl-indenyl)ZrCl$_2$,
Dimethylsilandiylbis(2-methyl-4,5-diisopropyl-1-indenyl)ZrCl$_2$,
Dimethylsilandiylbis(2,4,6-trimethyl-1-indenyl)ZrCl$_2$,
Phenyl(methyl)silandiylbis(2-methyl-4,6-diisopropyl-1-indenyl)ZrCl$_2$,
1,2-Ethandiylbis(2-methyl-4,6-diisopropyl-1-indenyl)ZrCl$_2$,
1,2-Butandiylbis(2-methyl-4,6-diisopropyl-1-indenyl)ZrCl$_2$,
Dimethylsilandiylbis(2-methyl-4-ethyl-1-indenyl)ZrCl$_2$,
Dimethylsilandiylbis(2-methyl-4-isopropyl-1-indenyl)ZrCl$_2$,
Dimethylsilandiylbis(2-methyl-4-t-butyl-1-indenyl)ZrCl$_2$,
Phenyl(methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(methyl)silandiylbis(2-methyl-4,5-benzo-1-indenyl)ZrCl$_2$,
Phenyl(methyl)silandiylbis(2-methyl-4,5-(methylbenzo)-1-indenyl)ZrCl$_2$,
Phenyl(methyl)silandiylbis(2-methyl-4,5-(tetramethylbenzo)-1-indenyl)ZrCl$_2$,
Phenyl(methyl)silandiylbis (2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,145,819; 5,243,001; 5,239,022; 5,329,033; 5,296,434; 5,276,208; 5,672,668; 5,304,614 and 5,374,752; and EP 549 900 and 576 970 all of which are herein fully incorporated by reference.

Additionally, metallocenes such as those described in U.S. Pat. No. 5,510,502 (incorporated herein by reference) are suitable for use in this invention.

Activators

Metallocenes are generally used in combination with some form of activator. The term "activator" is defined herein to be any compound or component, or combination of compounds or components, capable of enhancing the ability of one or more metallocenes to polymerize olefins to polyolefins. Alkylalumoxanes are preferably used as activators, most preferably methylalumoxane (MAO). Generally, the alkylalumoxanes preferred for use in olefin polymerization contain about 5 to 40 of the repeating units:

where R is a $C_1$–$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference. (As used herein unless otherwise stated "solution" refers to any mixture including suspensions.)

Ionizing activators may also be used to activate metallocenes. These activators are neutral or ionic, or are compounds such as tri(n-butyl)ammonium tetrakis (pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, EP 662 979 (incorporated herein by reference).

Descriptions of ionic catalysts for coordination polymerization comprised of metallocene cations activated by non-coordinating anions appear in the early work in U.S. Pat. Nos. 5,278,119, 5,407,884, 5,483,014, 5,198,401, EP 277 004 and EP 551 277, EP 670 688, EP 670 334 and EP 672 689 (each incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, EP 426 637 and EP 573 403 (each incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP 520 732 (incorporated herein by reference). Ionic catalysts for addition polymerization can also be prepared by oxidation of the metal centers of transition metal compounds by anion pre-cursors containing metallic oxidizing groups along with the anion groups, see EP 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP 500 944 and EP 0 570 982 (incorporated herein by reference) for in situ processes describing the reaction of alkyl aluminum compounds with dihalo-substituted metallocene compounds prior to or with the addition of activating anionic compounds.

Support Materials

The catalyst systems used in the process of this invention are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100 °C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and EP 705 281, EP 766 700, EP 766 702 (each incorporated herein by reference.) Alternatively, the metallocene may be preactivated separately and then combined with the support material either separately or together. If the metallocene and activator are separately supported, then preferably they are dried and combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support Methods of supporting ionic catalysts comprising metallocene cations and noncoordinating anions are described in EP 507 876, EP 702 700 and U.S. Pat. No. 5,643,847 (each incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 279 863 and EP 354 893 (each fully incorporated herein by reference).

Polymerization Processes

The polymer compositions of this invention are generally prepared in a multiple stage process wherein homopolymerization is conducted in each stage separately in parallel or, preferably in series. In each stage propylene is homopolymerized preferably with the same catalyst system but with a different concentration of chain termination agent in at least two of the stages.

Examples of chain termination agents are those commonly used to terminate chain growth in Ziegler-Natta polymerization, a description of which can be found in *Ziegler-Natta Catalyst and Polymerization Hydrogen;* J. Boor (Academic Press, 1979). Hydrogen and diethyl zinc are examples of agents that are very effective in the control of polymer molecular weight in olefin polymeriztions. Hydrogen is the preferred agent.

The concentration of chain termination agent in one stage is preferably sufficient to produce propylene homopolymer having a melt flow rate in the range of from about 0.15 dg/min. to about 4.0 dg/min, preferably from about 0.2 dg/min to about 2.0 dg/min, even more preferably from about 0.2 dg/min to about 1.0 dg/min and a molecular weight distribution (Mw/Mn) in the range from about 1.8 to about 2.5 and preferably from 1.8 to 2.3. The concentration of chain termination agent in a separate, either earlier or later stage, is preferably sufficient to produce homopolymer having a melt flow rate in the range of from about 5 dg/min to about 1000 dg/min, preferably from about 20 dg/min to about 200 dg/min and most preferably from about 30 dg/min to about 100 dg/min and a molecular weight distribution (Mw/Mn) in the range from about 1.8 to about 2.5 and preferably from 1.8 to 2.3.

The final homopolymer product comprises a reactor blend of the products prepared in the stages described above. Preferably the final product is comprised of from about 40% to about 80% product from the low melt flow rate stage and from about 20% to about 60% product from the high melt flow rate stage, more preferably from about 55% to about 65% product from the low melt flow rate stage and from about 35% to about 45% product from the high melt flow rate stage. The most desirable final melt flow rate is in the range of from about 0.2 to about 30 dg/min.

Although the focus of this invention is novel homopolymers with a unique combination of quite broad molecular weight distribution yet good physical properties and low extractables levels, it will be clear to persons skilled in the art that similarly unique combinations of properties will also be possible with copolymers, where controlled levels of comonomer(s) are additionally employed.

Individually, each stage may involve any process including gas, slurry or solution phase or high pressure autoclave processes. Preferably a slurry (bulk liquid propylene) polymerization process is used in each stage.

A slurry polymerization process generally uses pressures in the range of from about 1 to about 100 atmospheres (about 0.1 to about 10 MPa) or even greater and temperatures in the range of from −60° C. to about 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

Polymer Compositions

The polymer compositions of this invention are a reactor blend of isotactic homopolymers having differing weight average molecular weights such that the overall polymer has a molecular weight distribution that is in the range of from about 2.5 to about 20.0, preferably from about 2.8 to about 12.0, even more preferably from about 3.0 to about 8.0.

The propylene polymer compositions of this invention are particularly suitable for oriented film applications and preferably have a weight average molecular weight (MW) that is in the range of from about 140,000 to about 750,000 preferably from about 150,000 to about 500,000, and most preferably from about 200,000 to about 400,000. These polymer compositions preferably have a melt flow rate (MFR) that is in the range of from about 0.2 dg/min to about 30 dg/min, preferably from about 0.5 dg/min to about 20.0 dg/min, even more preferably from about 1.0 dg/min to about 10.0 dg/min. The melting point of the polymer is preferably greater than about 145° C., more preferably greater than about 150° C., and even more preferably greater than about 155° C. Upper limits for melting point depend on the specific application and metallocene used but would typically not be higher than 180° C. The hexane extractables level (as measured by 21 CFR 177.1520(d)(3)(i)) of the final polymer product is preferably less than 2.0 wt %, more preferably less than 1.0 wt %, despite the broad MWD.

The polymers of this invention can be blended with other polymers, particularly with other polyolefins. Examples of such would-be blends with conventional propylene polymers.

The propylene homopolymers of this invention exhibit exceptional film orientability and the films exhibit a good balance of properties. Any film fabrication method may be used to prepare the oriented films of this invention as long as the film is oriented at least once in at least one direction. Typically, commercially desirable oriented polypropylene films are biaxially oriented sequentially or simultaneously. The most common practice is to orient the film first longitudinally and then in the transverse direction. Two well known oriented film fabrication processes include the tenter frame process and the double bubble process.

We have found that the novel structure of the isotactic propylene polymer compositions of this invention translates to distinct differences versus standard films made with today's Ziegler-Natta produced propylene polymers and compared with films produced in a single stage polymerization process designed to produce narrow molecular weight distribution. As discussed in more detail below, biaxial stretching studies show that the films of this invention have a substantially broader processability range and can be evenly stretched at lower temperature. Stretching studies at elevated temperatures on cast sheets along machine direction (MD) and transverse direction (TD) indicate that the films of this invention stretch easily without breaking at lower stretching temperatures when compared to Ziegler-Natta produced propylene polymers. This indicates a capability to operate at significantly higher line speeds on commercial tenter frame lines, while still making oriented films having good clarity, stiffness and barrier properties.

The final films of this invention may generally be of any thickness, however, preferably the thickness is in the range of from about 1–150 μm, preferably 2–100 μm, and more preferably, 3 to 75 μm. There is no particular restriction with respect to draw ratio on film stretching, however, preferably the draw ratio is from about 4 to about 10 fold for monoaxially oriented films and from about 4 to about 15 fold in the transverse direction in the case of biaxially oriented films. Machine direction (MD) and transverse direction (TD) stretching is preferably carried out at a temperature in the range of from about 70° C. to about 200° C., preferably from about 80° C. to about 190° C. The films may be coextruded or laminated and/or may be single or multi-layered with the film of the invention comprising at least one component of the layers, typically the core layer.

Additives may be included in the film polymer compositions of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application. In addition, hydrogenated and/or petroleum hydrocarbon resins may be used as additives.

The film surfaces may be treated by any of the known methods such as corona or flame treatment. In addition standard film processing (e.g. annealing) and converting operations may be adopted to transform the film at the line into usable products.

EXAMPLES

A polypropylene consistent with this invention, Sample A, was compared to standard, narrow MWD metallocene-based and to conventional Ziegler-Natta based propylene polymers as follows. Sample A (invention) was prepared as follows.

A catalyst system precursor solution was prepared by combining 343 g of 30 wt % methylalumoxane in toluene (Albemarle Corp., Baton Rouge, La.) representing 1.76 moles Al with 6.36 g of dimethylsilylbis(2-methyl-4-phenylindenyl)zirconium dichloride (0.01 moles Zr) by stirring. Then 367 g of toluene was added and stirring was continued for 15 minutes. The precursor solution (625.9 g) was added to 392 g of Davison XPO 2407 silica (1.4–1.5 cc/g pore volume—available from W. R. Grace, Davison Chemical Division, Baltimore, Md.) previously heated to 600° C. under $N_2$. The ratio of liquid volume to total silica pore volume was 1.10. The solid had the consistency of damp sand and was dried at reduced pressure (483+mm Hg vacuum) and temperatures as high as 50° C. over 16 hours. 485.5 g finely divided, free-flowing solid catalyst were obtained. Elemental analysis showed 0.09 wt % Zr and 7.37 wt % Al.

Several batches of catalyst system were combined to provide the charge for the polymerization run. The catalyst system was oil slurried with Drakeol™ white mineral oil (Witco Chemical) for ease of addition to the reactor. The procedure for polymerizing Sample A was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as a scavenger at a rate of 1.6 g/hr. The catalyst system prepared above was fed as a 20% slurry in mineral oil and was flushed into the reactor with propylene. Propylene monomer was fed to the first reactor at a rate of 80 kg/hr and to the second reactor at a rate of 27 kg/hr. Hydrogen was added for molecular weight control at 500 mppm in the first reactor and 5000 in the second reactor. Reactor residence time was about 2.3 hours in the first reactor and about 1.7 hours in the second reactor. Polymer production rates were about 16 kg/hr in the first reactor and 8 kg/hr in the second reactor. Polymer was discharged from the reactors as granular product having a MFR of 3.7 dg/min. 60% of the final polymer product was derived from the first stage and 40% of the final polymer product was derived from the second stage.

Sample B (metallocene control) was prepared in similar fashion as described above for Sample A.

The procedure for polymerizing Sample B was the same as for Sample A except Hydrogen was added at 500 mppm to the first reactor and 900 mppm to the second reactor.

Sample C (Z-N control) is a commercial product available from Exxon Chemical Company (PP4782) It is a reactor blend of propylene homopolymer and propylene/ethylene copolymer with a melt flow rate of 2.1 dg/min and an ethylene content of 0.6 wt %.

Sample D was prepared as follows. The polymerization was conducted in a pilot scale, two reactor, continuous, stirred tank, bulk liquid-phase process. The reactors were equipped with jackets for removing the heat of polymerization. The reactor temperatures were 70° C. in the first reactor and 64.5° C. in the second reactor. Catalyst was fed at a rate of 3.5 g/hr. TEAL (2.0 wt % in hexane) was used as a scavenger at a rate of 17 wppm. The catalyst system prepared above was fed as a 20% slurry in mineral oil and was flushed into the first reactor with propylene. Propylene monomer was fed to the first reactor at a rate of 80 kg/hr and to the second reactor at a rate of 30 kg/hr. Hydrogen was added for molecular weight control at 500 mppm in the first reactor and 8000 in the second reactor. Reactor residence time was about 2.5 hours in the first reactor and about 1.8 hours in the second reactor. Polymer production rates were about 20 kg/hr in the first reactor and 11 kg/hr in the second reactor. Polymer was discharged from the reactors as granular product having a MFR of 1 dg/min. 65% of the final polymer product was derived from the first stage and 35% of the final polymer product was derived from the second stage.

The invention polymer (Samples A), metallocene-catalyzed control (Sample B) Ziegler-Natta catalyzed control (Samples C) were converted to biaxially oriented films to assess ease of stretching and orientation. This step is recognized to be the critical point in the fabrication of such oriented films. One of the procedures adopted was one that is widely used in the art and involved cast extrusion of a sheet of polymer (typically 500 µm to 650 µm thick) followed by biaxial orientation at elevated temperature on a stretching apparatus such as a film stretcher from the TM Long Co., Somerville, N.J. (henceforth referred to as TM Long machine) to yield a final thickness of 15 µm to 25 µm. Ease of film stretching or orientation was judged from the uniformity of stretching (i.e., even stretch versus the presence of stretch bands), film sagging and in the most severe case, film breakage. A desired stretching profile is one that offers even stretching, without any stretch bands, breakage or sagging over a wide range of stretching temperatures.

Figure 1:
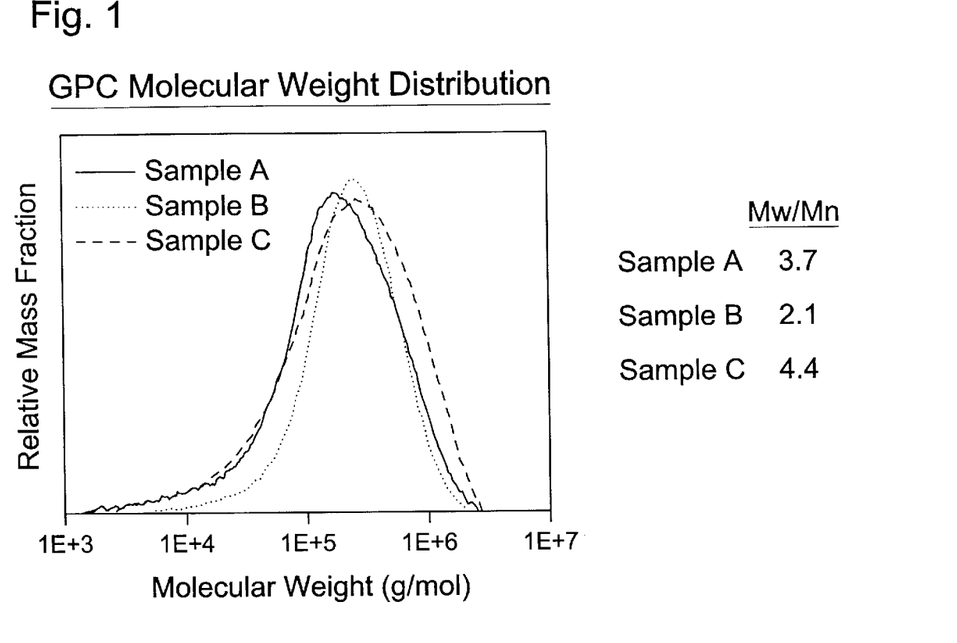
Figure 1A:
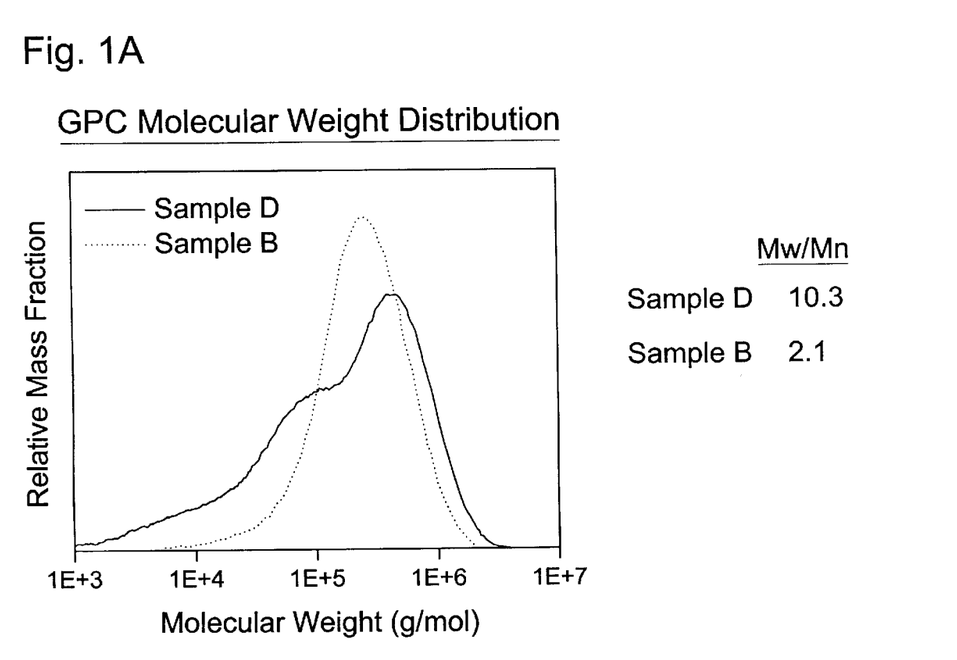

As a result of the highly unbalanced MFR in a two-stage polymerization, invention polymer (Sample A) from this process exhibits a relatively broad molecular weight distribution. A comparison of the molecular weight distribution of Sample A versus Samples B and C is shown in FIG. 1. Sample A has a molecular weight distribution (Mw/Mn) broader than the narrow molecular weight distribution metallocene (Sample B) and close to that of Ziegler-Natta polymer (Sample C). Low extractables are maintained despite the broadening of MWD. As a further illustration of the substantial MWD broadening possible with the invention polymers, the case of Sample is shown in FIG. 1A. Sample D has an MFR of about 1 dg/min. Despite the substantial level of molecular weight distribution broadening attained (Mw/Mn about 10.0), the hexane extractables for Sample D was only 0.8 wt %. The xylene solubles was 1.16 wt %. Key resin parameters are compared in Table 1. A film processability study was conducted using a T. M. Long (made in 1991) biaxial stretching apparatus to compare the range of temperatures over which uniform stretching is achieved. A 20 mil thick sheet was first prepared on a Killion cast line and then cut into 50.8 mm×50.8 mm (2"×2") square plaques for the processability study. During the processability study, each sample plaque was preheated for 27 seconds followed by biaxial stretching at 76.2 mm/sec (3"/sec) strain rate to form a 304.8 mm×304.8 mm (12"×12") oriented film. Even stretch was judged by observing the film area for good stretching uniformity with lack of unstretched marks or sagging marks.

Figure 2:
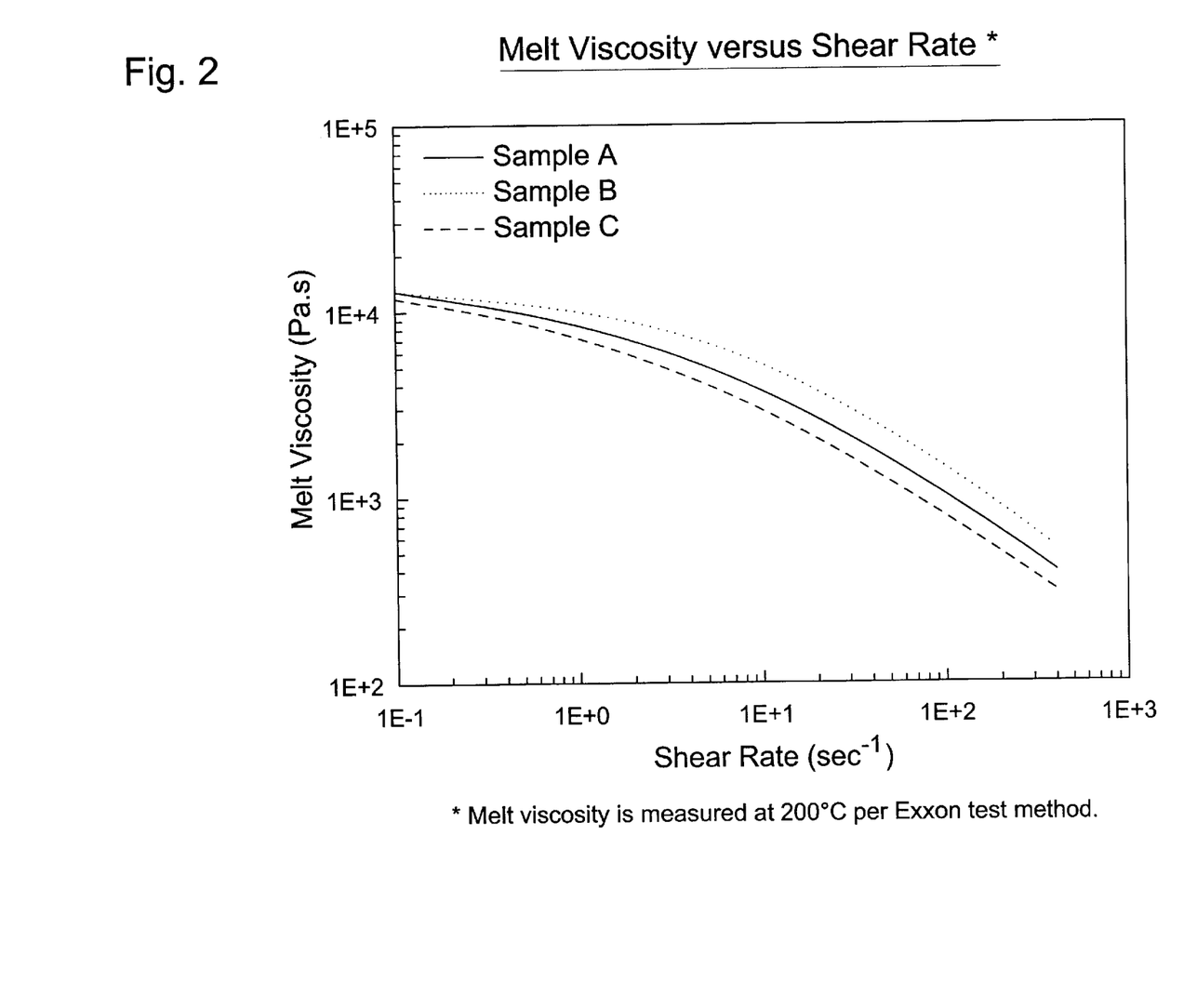
Figure 3:
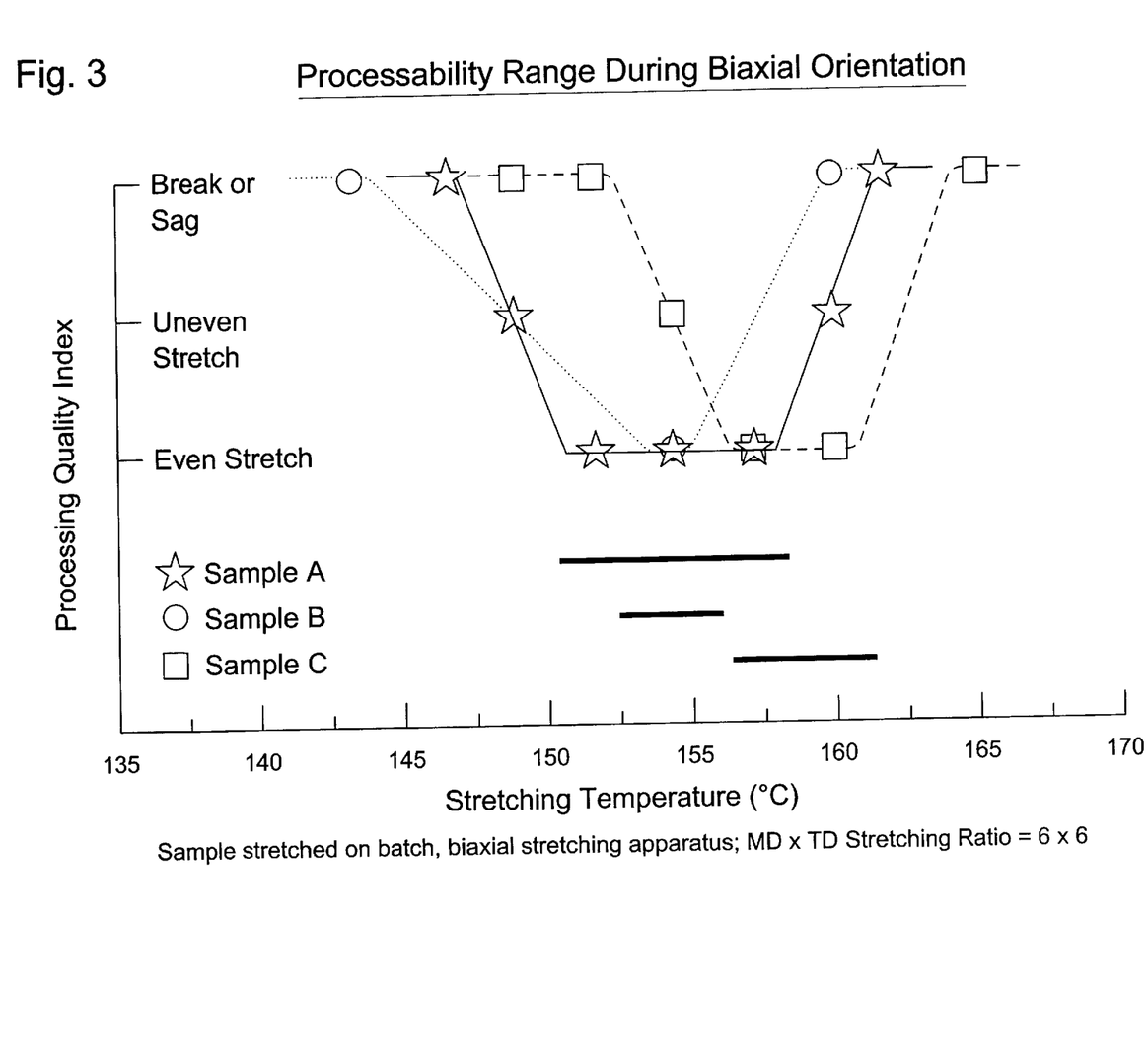

The film processabilities of the polymers are compared in Table 2 and FIG. 2. The stretching performance of Sample A is seen to be superior to those of Samples B and C. In particular, Sample A achieves greater processing latitude and the capability of stretching at reduced oven temperatures—two desirable features for potential high speed biaxially oriented tenter line applications.

As shown in Table 3, the film properties of Sample A compare favorably with those of Samples B and C. Normally, the most important properties in OPP product performance are high stiffness, low haze, high moisture barrier and low heat shrinkage. The high barrier and stiffness properties offer better food preservation and thinner gauge and lower heat shrinkage improves the heat resistance of high speed multicolor printing at high temperature. Surprisingly, the shrinkage of Sample A film is maintained despite its lower melting temperature.

Although the Examples deal primarily with films, it will be instantly recognized that the attributes of the invention polymers will lend themselves to use in other end-application areas as well. For example, in thermoforming and blow molding, fibers and fabrics, the increased melt strength derived from the broadening of distribution to the high molecular weight end, coupled with the easier orientability at lower temperatures, should result in performance benefits versus standard, narrow molecular weight distribution metallocene-catalyzed propylene polymers, as well as conventional Ziegler-Natta propylene polymers, while maintaining the general low extractable attribute of metallocene-catalyzed propylene polymers.

TABLE 1

Description of Samples*

| Sample | Catalyst | MFR | Melting Temp. (° C.) | Mw/Mn | Hexane Extractables (wt %) | Crystallization Temp. (° C.) |
|---|---|---|---|---|---|---|
| A (invention) | MCN | 2.0 | 151 | 3.7 | 0.5 | 111 |
| B (control) | MCN | 2.0 | 151 | 2.1 | 0.3 | 110 |
| C (control) | Z-N | 2.1 | 157 | 4.4 | 1.7 | 110 |
| D (invention) | MCN | 1.0 | 151 | 10.3 | 0.8 | 111 |

*MFR was determined via the method of ASTM D 1238-95 Condition L. The melting temperature and crystallization temperature were determined from peak temperatures from DSC runs at 10° C./min. heating and cooling rates. Mw/Mn was determined using Gel Permeation Chromatography. Percent hexane extractables was determined via 21 CFR 177.1520 (d)(3)(i).

TABLE 2

Biaxially Oriented Film Processability*

| Stretching Temperature (° C.) | Sample A | Sample B | Sample C |
|---|---|---|---|
| 140.6 | | | |
| 143.3 | | B | |
| 146.1 | B | | |
| 148.9 | U | U | B |
| 151.7 | E | U | B |
| 154.4 | E | E | U |
| 157.2 | E | U | E |
| 160.0 | U | S | E |
| 166.0 | S | | S |

*Samples stretched on TM Long stretching apparatus; MD × TD stretching ratio = 6 × 6; preheat time 27 sec; stretch rate 76.2 mm/sec (3 in/sec); initial sheet thickness ~ 500 μm (20 mil); final stretched film thickness ~ 20 μm (0.75 mil)
E = Even stretch,
U = Uneven stretch (i.e., unstretched marks/unstretched regions),
B = Break,
S = Sagging

TABLE 3

Biaxially Oriented Film Properties*

| Film Property | Sample A Invention | Sample B (Control) | Sample C (Control) |
|---|---|---|---|
| Thickness, μm | 18 | 18 | 16 |
| Haze % | 0.2 | 0.3 | 0.4 |
| Gloss % | 95 | 95 | 95 |
| WVTR @ 37.8° C. & 100% RH, g/m²/day per 25.4 μm | 5.3 | 5.3 | 5.8 |
| 1% Sec. Modulus, MPa (kpsi) | 2372 (344) | 2468 (358) | 2356 (342) |
| Ultimate Tensile Strength, MPa (kpsi) | 193 (28) | 217 (32) | 206 (30) |
| Shrinkage at 135° C./180s, % | 19 | 21 | 20 |
| Ultimate Elongation, % | 65 | 75 | 67 |

*Films prepared on TM Long stretching apparatus; MD × TD stretching ratio = 6 × 6; preheat time 27 sec. Film thickness determined using a profilometer; Haze measured per ASTM D 1003; Gloss per ASTM D 2457; WVTR per ASTM F 372; Tensile properties and 1% secant modulus by ASTM D 882. Stretching temperature was 154° C. for samples A and B & 157° C. for Sample C.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. A process for polymerizing isotactic polypropylene, said process comprising the steps of:
   (a) polymerizing propylene in the presence of a metallocene and a first concentration of chain transfer agent sufficient to produce a first propylene homopolymer having a melt flow rate in the range from 0.15 dg/min to 4.0 dg/min;
   (b) polymerizing propylene in the presence of the first propylene homopolymer in the presence of a second concentration of chain transfer agent sufficient to produce the isotactic polypropylene having a molecular weight distribution in the range of from about 2.5 to about 20.

2. The process of claim 1 wherein the first propylene homopolymer has a molecular weight distribution in the range of 1.8 to 2.5.

3. The process of claim 1 wherein step (a) is performed in a first reactor and step (b) is performed in a second reactor.

4. The process of claim 1 wherein the metallocene is a single metallocene.

5. The process of claim 4 wherein the single metallocene is present in step (b).

6. The process of claim 1 step (b) wherein a second propylene homopolymer is produced having a molecular weight distribution in the range of 1.8 to 2.5.

7. The process of claim 6 wherein the second propylene homopolymer has a melt flow rate in the range from 5 dg/min to 1000 dg/min.

8. A process for polymerizing isotactic polypropylene, said process comprising the steps of:
   (a) polymerizing propylene in the presence of a metallocene and a first concentration of chain transfer agent sufficient to produce a first propylene homopolymer having a melt flow rate in the range from 0.15 dg/min to 4.0 dg/min and a molecular weight distribution in the range of 1.8 to 2.5;

(b) polymerizing propylene in the presence of the first propylene homopolymer in the presence of a second concentration of chain transfer agent sufficient to produce the isotactic polypropylene having a molecular weight distribution in the range of from about 2.5 to about 20.

9. A process for polymerizing isotactic polypropylene, said process comprising the steps of:

(a) polymerizing propylene in a first reactor in the presence of a metallocene and a first concentration of chain transfer agent sufficient to produce a first propylene homopolymer having a melt flow rate in the range from 0.15 dg/min to 4.0 dg/min and a molecular weight distribution in the range of 1.8 to 2.5;

(b) polymerizing propylene in a second reactor in the presence of the first propylene homopolymer in the presence of a second concentration of chain transfer agent sufficient to produce the isotactic polypropylene having a molecular weight distribution in the range of from about 2.5 to about 20.

10. A process for polymerizing isotactic polypropylene, said process comprising the steps of:

(a) polymerizing propylene in the presence of a metallocene and a first concentration of chain transfer agent sufficient to produce a first propylene homopolymer having a melt flow rate in the range from 0.15 dg/min to 4.0 dg/min and a molecular weight distribution in the range of 1.8 to 2.5;

(b) polymerizing propylene in the presence of the first propylene homopolymer in the presence of a second concentration of chain transfer agent sufficient to produce a second propylene homopolymer having a molecular weight distribution in the range of from about 1.8 to about 2.5.

11. A process for polymerizing isotactic polypropylene, said process comprising the steps of:

(a) homopolymerizing propylene in the presence of a single metallocene and a first concentration of chain transfer agent sufficient to produce a first propylene homopolymer having a melt flow rate in the range from 0.15 dg/min to 4.0 dg/min and a molecular weight distribution in the range of 1.8 to 2.5;

(b) homopolymerizing propylene in the presence of the first propylene homopolymer and the single metallocene in the presence of a second concentration of chain transfer agent sufficient to produce a second propylene homopolymer having a molecular weight distribution in the range of 1.8 to 2.5 and a melt flow rate in the range from 5 dg/min to 1000 dg wherein the isotactic polypropylene is a blend of the first and second homopolymer having a molecular weight distribution in the range of from about 2.5 to about 20 and wherein the first homopolymer comprises from 40 percent to 80 percent of the isotactic polypropylene and the second homopolymer comprises from 20 percent to 60 percent of the isotactic polypropylene.

* * * * *